July 26, 1966     H. A. DUVALL     3,263,130
MANUAL BY-PASS SWITCH FOR METER RECEPTACLE ASSEMBLY
Filed Nov. 21, 1963     2 Sheets-Sheet 1
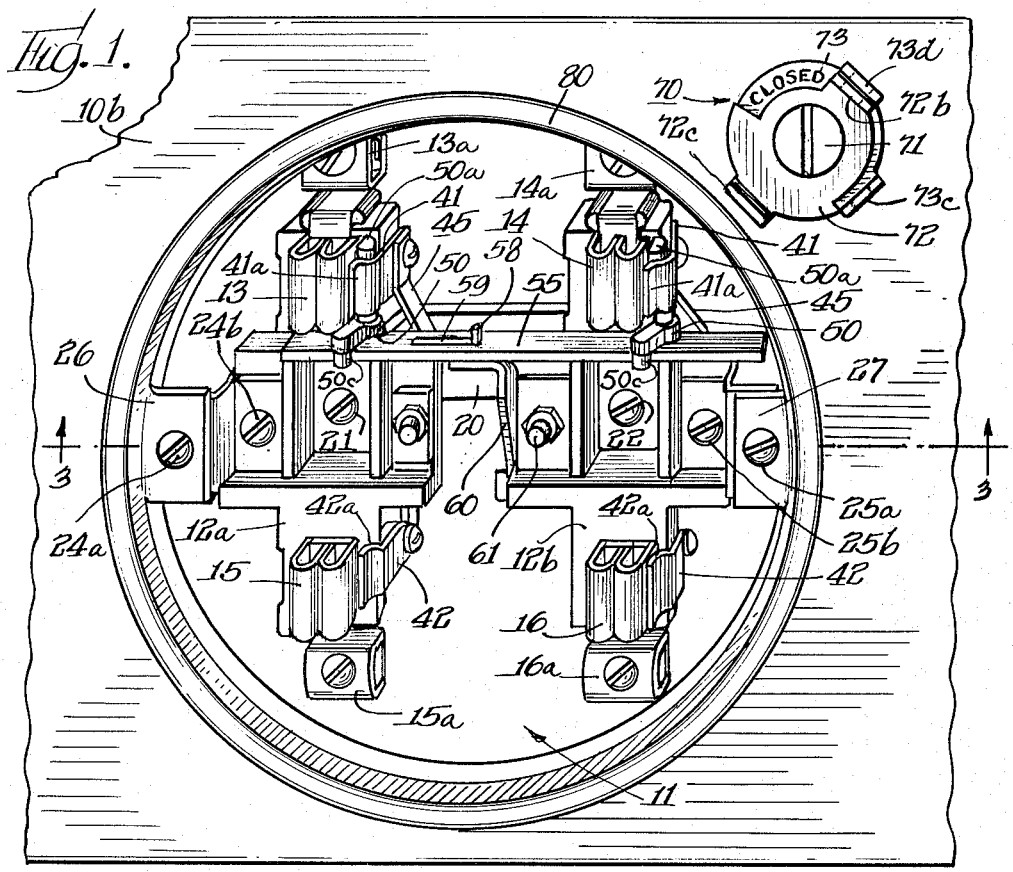
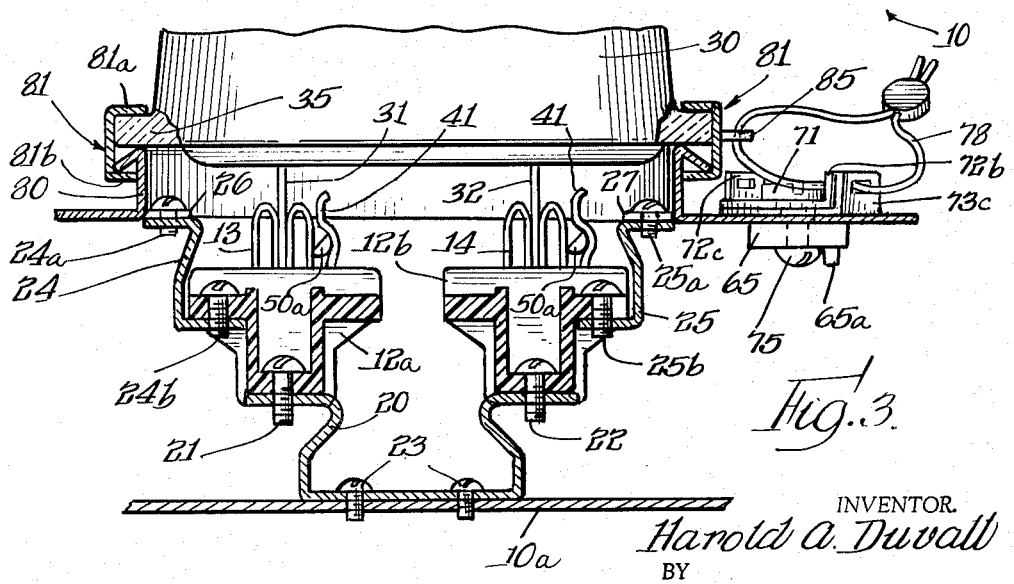
INVENTOR.
Harold A. Duvall
BY
Harold J. Rathbun
Atty.

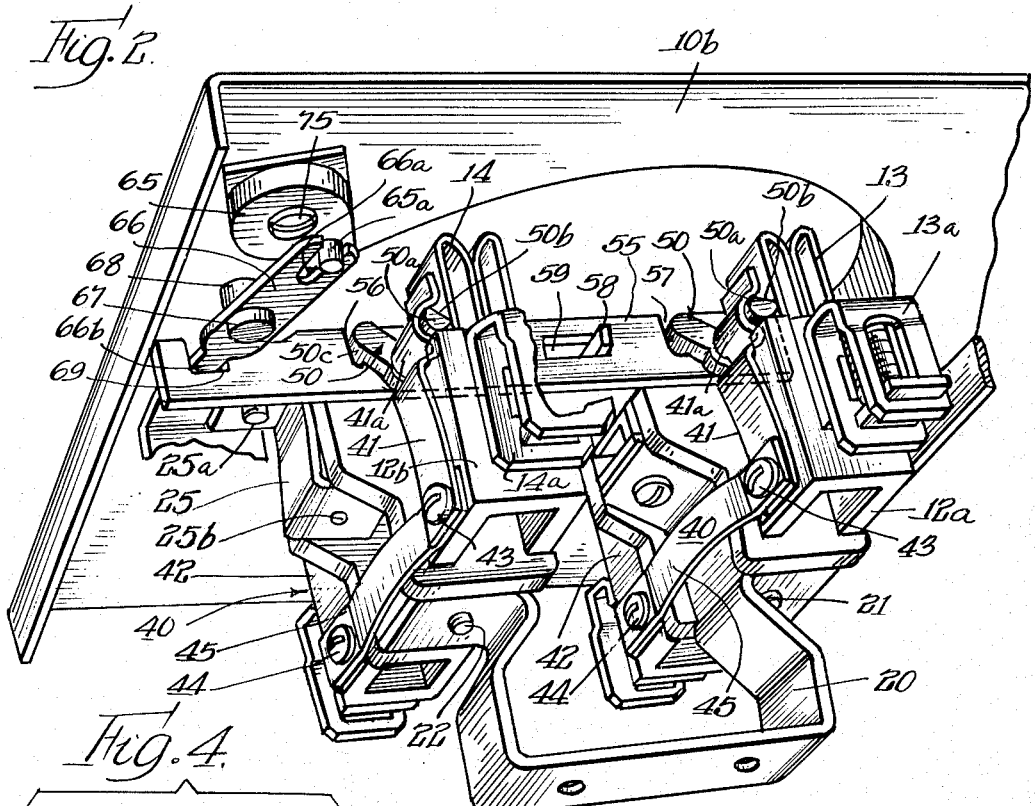
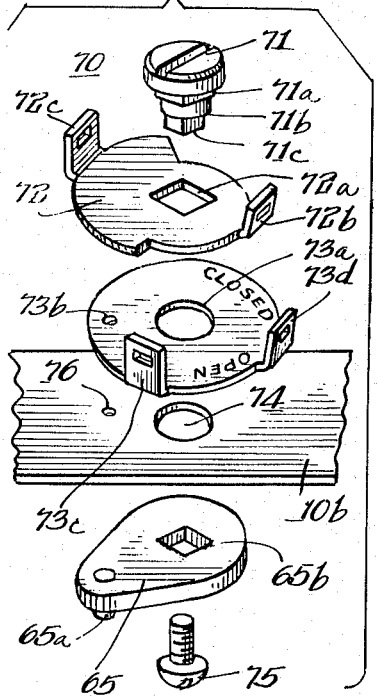
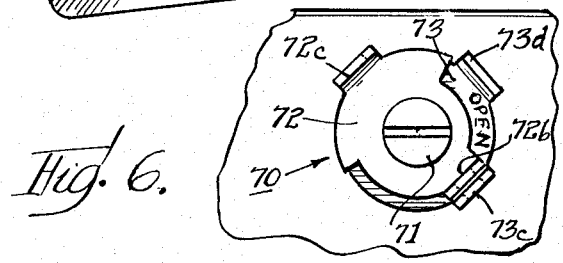
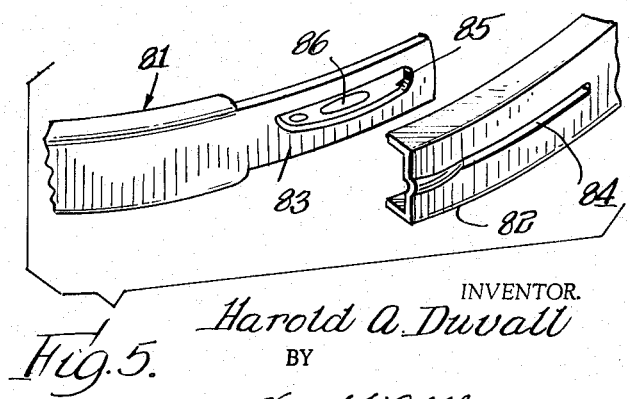

United States Patent Office 3,263,130
Patented July 26, 1966

3,263,130
MANUAL BY-PASS SWITCH FOR METER RECEPTACLE ASSEMBLY
Harold A. Duvall, Pasadena, Calif., assignor to Square D Company, Park Ridge, Ill., a corporation of Michigan
Filed Nov. 21, 1963, Ser. No. 325,261
6 Claims. (Cl. 317—107)

This invention relates to a receptacle assembly for watt-hour meters and, more particularly, to a watt-hour meter receptacle assembly having manually operable by-passing means for preventing interruption of power flow to the load when the meter is removed from the receptacle assembly.

In order to test and recalibrate a watt-hour meter, it is necessary to remove the meter from its receptacle. Because the current flowing to the load being metered must flow through the meter, removal of the meter from its receptacle interrupts the flow of current to the load unless means are provided to complete an alternate path for the flow of load current. Even a momentary interruption of power is apt to be of material disadvantage because of the nature of the present day loads. For example, most loads include one or more electric clocks so that an interruption of even a few minutes duration is noticeable and troublesome.

It is an object of this invention to provide a watt-hour meter receptacle assembly which includes an improved manually operable switch mechanism for by-passing the meter to prevent interruption of power flow to the load upon removal of the meter from the receptacle assembly.

A further object is to provide a watt-hour meter receptacle assembly having a by-pass switch mechanism and which includes improved means to prevent unauthorized and inadvertent operation of the by-pass switch mechanism.

A further object is to provide a watt-hour meter receptacle assembly having a by-pass switch mechanism and improved means for preventing the locking of the meter in its installed position unless the by-pass switch mechanism is in its open circuit position.

A further object is to provide an improved by-pass switch mechanism for a watt-hour meter receptacle assembly that is rugged in construction yet readily incorporated in meter receptacle assemblies of conventional size not having a manual by-pass switch.

A watt-hour meter receptacle in accordance with this invention comprises an enclosure containing four plug-in sockets for receiving respective contact blades of a plug-in watt-hour meter. Two of the sockets, the line sockets, are for connection to a source of power, and the other two sockets, the load sockets, are for connection to a load. Particularly, the invention is characterized by the provision of a manually operable by-pass switch mechanism for electrically interconnecting the line and load sockets so that the meter may be removed from the receptacle assembly without interrupting the flow of electrical power to a load being supplied through the meter. The by-pass switch mechanism comprises four resilient contact members. Two of the contact members are in continuous contact with the load sockets, respectively, and the other two contact members are deflectable by operation of a manual operator mechanism so as to be moved selectively between positions of engagement and disengagement with the line sockets, respectively. An operator mechanism includes a pair of crank members each having an operating shaft portion interposed between one of the deflectable contact members and a side wall of its associated line socket. Electrical contact may thus be selectively established and disestablished between the load and line sockets depending on the turned position of the crank members. A manual operator mechanism for the switch mechanism is accessible from the front of the receptacle assembly, and includes means for preventing the meter from being inserted in the receptacle assembly and locked in place while the meter by-pass switch mechanism is operative to by-pass the meter.

Other objects and advantages of this invention will become apparent from the following specification wherein reference is made to the drawings, in which:

FIGURE 1 is a perspective view, looking from the front, of a watt-hour meter receptacle assembly in accordance with this invention;

FIGURE 2 is a perspective view, looking from the rear, of the meter receptacle assembly with a portion of the enclosure omitted;

FIGURE 3 is a sectional view of the meter receptacle assembly taken generally along the line 3—3 of FIGURE 1, but with a meter and a locking ring mounted thereon and a manual operator mechanism in its open position;

FIGURE 4 is an exploded view of the manual operator mechanism;

FIGURE 5 shows details of the locking ring, and

FIGURE 6 is a front view of the manual operator mechanism in open position.

Referring to FIGURES 1, 2, and 3, a watt-hour meter receptacle assembly in accordance with this invention comprises a generally rectangularly shaped enclosure 10 having a body portion 10a and a front cover portion 10b provided with a circular opening 11 therein. The enclosure 10 contains a pair of insulating bases 12a and 12b each of which supports a pair of plug-in sockets of the spring-jaw type. The base 12a supports sockets 13 and 15 and the base 12b supports sockets 14 and 16. A plurality of terminal members 13a, 14a, 15a and 16a extend from the sockets 13, 14, 15 and 16, respectively, to facilitate the connection of the sockets 13 and 14, hereinafter the line sockets, to a source of power (not shown) and the sockets 15 and 16, hereinafter the load sockets, to a load (not shown).

The insulating bases 12a and 12b are secured to respective out-turned flange portions of a U-shaped support bracket 20 by respective screws 21 and 22, the bracket 20 in turn being secured to the back of the body portion 10a of the enclosure 10 by a pair of screws 23. A pair of Z-shaped support brackets 24 and 25 are secured, at their outer ends, to respective radially aligned flange portions 26 and 27 of the cover 10b by screws 24a and 25a, respectively, and at their inner ends, to the insulating bases 12a and 12b, respectively, by screws 24b and 25b.

In accordance with the present invention, a manually operable by-pass switch mechanism is provided to maintain electrical continuity between the line and load sockets respectively, i.e., between the sockets 13 and 15 and between the sockets 14 and 16, whenever a watt-hour meter 30 (FIGURE 3) is removed from the enclosure 10 for servicing or the like. The meter has two pairs of contact blades 31 and 32 and a peripheral flange 35. Only one of each pair of blades is shown.

As best seen in FIGURE 2, contact-making portions 40 of the by-pass switch mechanism are provided for the pairs of sockets 13-15 and 14-16, respectively. Each contact-making portion 40 includes a pair of flat, resilient conductive contact members 41 and 42 constructed of spring metal such as Phosphor-bronze. The contact members 41 and 42 of each contact making portion 40 have reversely curved outer end portions 41a and 42a, respectively, and are stresed to press the outer end portions 41a and 42a inwardly thereby to make contact with the outer sides of the plug-in sockets. More specifically (and as best seen in FIGURE 1), the pair of contact members 41 respectively engage the line sockets 13 and 14 and the pair of contact members 42 respectively engage the load sockets 15 and 16. As shown in FIG- URE 2, the pair of contact members 41 are fastened at their inner ends to the insulating bases 12a and 12b, respectively, by bolts 43 and the pair of contact members 42 are fastened at their inner ends to the insulating bases 12a and 12b, respectively, by bolts 44. The contact members 41 and 42 of each contact-making portion 40 are electrically interconnected by a conductive link 45. Each conductive link 45 is fastened at its opposite ends to its associated contact members 41 and 42 by the bolts 43 and 44, respectively.

The contact members 42 remain in continuous physical contact with their associated load sockets 15 and 16 due to their resiliency while means are provided to deflect the contact members 41 so as to selectively make and break electrical contact with their associated line sockets 13 and 14. The deflecting means comprises a pair of cranks 50 having respective operating shaft portions 50a disposed respectively between the end portions 41a of the contact members 41 and the sides of the line sockets 13 and 14. Each of the shaft portions 50a is generally cylindrical in form with a flattened surface 50b extending axially along one side. When the flattened surfaces 50b are positioned to be coextensive with the sides of the respective line sockets 13 and 14, electrical contact occurs between the contact members 41 and the respective line sockets 13 and 14 due to the reduced effective thickness of the shaft portions 50a when in this position as shown in FIGURE 1. In any other turned position, the flattened portions 50b are not in alignment with the sides of the line sockets 13 and 14 and electrical contact between the contact members 41 and the line sockets 13 and 14 is effectively prevented due to the effective thickness of shaft portions 50a when in this position as shown in FIGURE 3. It is therefore apparent that the shaft portions 50a function as cams to move the contact members 41 in and out of electrical engagement with their associated sockets 13 and 14.

Rotation of the cranks 50 is effected by lateral movement of an operating bar 55 positioned transversely of the insulating bases 12a and 12b and sliding thereon. The cranks 50 include respective tongue portions 50c which are received within spaced slots 56 and 57, respectively, formed in the operating bar 55. Lateral movement of the bar 55 thus causes the cranks 50 to rotate about shaft portions 50a within the respective end portions 41a of the contact members 41. The limits of lateral movement of the bar 55 are defined by a stop 58 disposed in a central guide slot 59 formed in the bar 55 intermediate the slots 56 and 57. As best seen in FIGURE 1, the stop 58 is an integral tongue portion bent outwardly from an angle bracket 60 fastened to the insulating base 12b by a bolt 61.

As seen in FIGURE 2, lateral movement of the operating bar 55 is effected by rotation of a disc 65 which carries an eccentric pin 65a received in an open-ended slot 66a formed in an end portion of a lever 66. The lever 66 is pivoted intermediate of its ends on a shouldered rivet 67 having a shank extending through a spacer 68 and suitably anchored at its inner end to the cover 10b. Turning of the lever 66 about its pivotal axis causes a tongue portion 66b thereof to impart reciprocating motion to the bar 55 by engagement with shoulder portions defined by a slot 69 formed in the bar.

Rotation of the disc 65 is effected by an operator mechanism 70 accessible from the front of the enclosure 10 as shown in FIGURE 1. The mechanism 70 comprises an operator screw head 71, a stop-plate 72 and an indicator plate 73. As best seen in the exploded view of FIGURE 4, the operator screwhead 71 has axially-aligned reduced portions 71a, 71b, and 71c, the portions 71a and 71c being of non-circular, e.g. square, cross-section while the portion 71b is of circular cross-section. In assembling the mechanism 70, the portion 71a of the screwhead 71 makes a sliding fit with a complementary opening 72a in the stop-plate 72; the portion 71b makes a sliding fit with a circular opening 73a in the indicator plate 73 and with an opening 74 in the cover 10b; and the portion 71c makes a sliding fit with a complementary opening 65b in the disc 65. The screwhead 71 is threaded internally for receiving a locking screw 75 to complete the assembly of the mechanism 70.

The indicator plate 73 includes an inwardly extending indentation 73b (FIGURE 4) which is received within an opening 76 in the cover 10b to prevent movement of the plate 73 with respect to the cover. It is therefore seen that rotation of the screwhead 71 of the operator mechanism 70 results in the rotation of the stop-plate 72 and the disc 65 while the indicator plate 73 remains stationary. The screwhead 71 and the rotatable disc 65 are preferably formed from a phenolic moulded material and the stop-plate 72 and the indicator plate 73 are preferably formed from steel. The stop-plate 72 further includes a pair of diametrically-spaced, slotted flanges 72b and 72c extending vertically outwardly from its surface while the indicator plate 73 includes a pair of peripherally-spaced flanges 73c and 73d.

In operation, when the operator screwhead 71 is rotated to the closed position shown in FIGURE 1 as by a screwdriver or like implement, the operating bar 55 moves to the left as viewed in FIGURE 1 and to the right as viewed in FIGURE 2 by the action of the disc 65 and the lever 66 as previously described. This movement causes the cranks 50 to rotate to a position where the flattened surface portions 50b become coextensive with the outer sides of the line sockets 13 and 14, respectively, as seen in FIGURE 1, thereby permitting electrical contact between the contact members 41 and the line sockets 13 and 14. Because the contact members 42 are in continuous contact with the sockets 15 and 16, electrical continuity is therefore established between the pairs of load and line sockets, i.e., between the sockets 13 and 15 and between the sockets 14 and 16, through the associated meter by-pass members 41, 45 and 42.

The indicator plate 73 is appropriately marked "closed" and when in the position just described the word "closed" is visible to indicate that the meter by-pass mechanism 40 has been operated to establish electrical continuity between the power source and the load. The watt-hour meter 30 may then be removed from the enclosure 10 without interruption of power. Further, in the "closed" position, the flange 72b of the stop-plate 72 is aligned with the flange 73d of the inductor plate 73 so that a locking wire such as the wire 78 of FIGURE 3 may be extended through the now-aligned slots in the flanges 72b and 72d and suitably sealed to prevent any movement of the operator screwhead 71 to change the position of the switch mechanism while the meter 30 remains detached from the enclosure 10.

When the operator screwhead 71 is rotated in a counter-clockwise direction as viewed in FIGURE 1 from the closed position, the operating bar 55 is moved laterally to the right as shown in FIGURE 1 and to the left as seen in FIGURE 2 so that the cranks 50 are rotated to a position where the flattened surface portions 50b are out of alignment with the outer sides of the line sockets 13 and 14 (as shown in FIGURE 3). As a result, the electrical contact is broken between the contact members 41 and their associated line sockets 13 and 14. The indicator plate 73 is appropriately marked "open" so that in this position the word "open" is visible as shown in FIGURE 6 to indicate that each contact-making mechanism 40 is in the inoperative or open position. In the open position, the flange 72b of the stop-plate 72 is aligned with the flange 73c of the indicator plate 73 as seen in FIGURE 3 so that the locking wire 78 may be extended through the now-aligned slots in the flanges 72b and 73c to prevent further movement of the operator screwhead 71.

As shown in FIGURE 3, the pairs of depending contact blades 31 and 32 of the watt-hour meter 30 are received in the meter sockets 13, 14, 15 and 16, respectively. The peripheral flange 35 of the meter 30, when in the installed position, rests on an annular flange 80 formed in the cover 10b about the opening 11 and is held in position thereon by a locking ring 81 having upper and lower inturned flanges 81a and 81b. The upper flange 81a engages the upper surface of the meter flange 35 and the lower flange 81b engages the lower surface of the flange 80 thereby to secure the meter 30 to the enclosure 10. The locking ring 81 preferably is formed of spring metal and has interlocking end portions 82 and 83 (FIGURE 5), the end portion 82 having a slot 84 which receives a tab 85 formed on the end portion 83. An opening 86 in the tab 85 may also receive the locking wire 78 (FIGURE 3) before sealing to prevent removal of the watt-hour meter 30 from the enclosure 10. In addition to passing through the opening 86, the wire 86 passes through the slots in the flanges 72b and 73d to prevent turning of the operator screwhead 71.

Further, when the meter 30 has been removed from the enclosure 10 and the operator screwhead 71 has been rotated to place the mechanism 70 in the closed position, as shown in FIGURE 1, the flange 72c of stop-plate 72 is positioned adjacent the annular flange 80 to prevent the installation of the locking ring 81 around the meter 30 and the annular flange 80. When the screwhead 71 has been rotated to place the mechanism 70 in the open position, as shown in FIGURE 3 and 6, the flange 72c is spaced from the flange 80 to permit the installation of the locking ring 81.

I claim:

1. A meter receptacle assembly for a watt-hour meter having two pairs of contact blades extending outwardly therefrom, said meter receptacle assembly comprising an enclosure including a front cover portion having an opening therein, two pairs of spring-jaw sockets mounted in said enclosure in alignment with said opening in said front cover portion and respectively adapted to receive the contact blades of the meter, and by-pass switching means operable to provide continuous electrical service when the meter is removed from said meter receptacle assembly and said contact blades are removed from said spring-jaw sockets, said by-pass switching means including a pair of electrically conductive contact members mounted in said enclosure respectively adjacent the spring-jaw sockets of one of said pairs thereof and having portions movable into and out of engagement respectively therewith, means in said enclosure electrically connecting said contact members respectively with the spring-jaw sockets of the other of said pairs thereof, a pair of cam means respectively disposed between said contact members and said spring-jaw sockets of said one pair thereof and turnable while therebetween to one position to effect engagement of said contact members respectively with said spring-jaw sockets of said one pair thereof and to another position to effect disengagement of said contact members respectively from said spring-jaw sockets of said one pair thereof, and operating means mounted on said front cover portion and operatively connected to said cam means, said operating means being operable from the front of said front cover portion to turn said cam means.

2. A meter receptacle assembly as claimed in claim 1, wherein said pair of cam means includes a pair of non-conductive crank members having generally cylindrical operating shaft portions interposed between said contact members and the sides of their associated sockets, respectively, said shaft portions each having a flattened surface extending axially along one side thereof and being operative to effect electrical contact between said contact members and their associated sockets, respectively, when said flattened surfaces are substantially coextensive with the respective sides of the associated sockets and to prevent such electrical contact in all other turned positions, and means are provided for rotating said crank members about their respective operating shaft portions.

3. A meter receptacle assembly as claimed in claim 2, wherein the means for rotating the crank members about their operating shaft portions includes a reciprocable operating bar having spaced slots therein for receiving respective arm portions of said crank members in a manner such that reciprocal movement of said operating bar rotates said crank members about said operating shaft portions, and means are provided for effecting reciprocation of said operating bar.

4. A meter receptacle assembly as claimed in claim 3, wherein the means for effecting reciprocation of said operating bar includes rotatable eccentric means operatively connected to said operating bar and control means accessible from outside said enclosure for rotating the eccentric means.

5. A meter receptacle assembly as claimed in claim 4, wherein said control means includes means for receiving a locking wire therethrough.

6. A meter receptacle assembly for a watt-hour meter having two pairs of contact blades extending outwardly therefrom, said meter receptacle assembly comprising an enclosure having a front cover portion, two pairs of springjaw sockets mounted in said enclosure and respectively adapted to receive the contact blades of the meter, the sockets of one of said pairs being line sockets adapted to be connected to a source of power and the sockets of the other of said pairs being load sockets adapted to be connected to a load, the meter providing a path for current to flow between said line and load sockets when said contact blades are received in said sockets, by-pass switching means operable to provide continuous electrical service by means of an alternate circuit between said line and load sockets so that current can continue to flow therebetween upon removal of the meter from said meter receptacle assembly and removal of said contact blades from said sockets, said by-pass switching means including two pairs of conductive contact members mounted in said enclosure, the contact members of each pair being electrically interconnected by a conductive link, one of said contact members of each of said pairs being disposed adjacent a respective one of said line sockets and the other of said contact members of each of said pairs being disposed adjacent a respective one of said load sockets, said contact members being springbiased toward and engageable with their respective sockets, a pair of non-conductive crank members respectively having a pair of crank arm portions and a pair of generally cylindrical operating shaft portions, said operating shaft portions being interposed respectively between said line sockets and their respective contact members, each of said operating shaft portions having a flattened surface extending axially along one side thereof and being operative to effect electrical contact between its respective line socket and contact member when said flattened surface is substantially coextensive with the side of its respective line socket and to prevent such electrical contact in all other turned positions, an operating bar reciprocably mounted in said enclosure and having a pair of spaced slots therein for respectively receiving said crank arm portions of said crank members in a manner such that reciprocal movement of said operating bar effects rotation of said crank members respectively about their operating shaft portions, and manual operator means accessible from the outside of said enclosure and operable to effect said reciprocal movemet of said operating bar, said manual operator means including a lever pivotably mounted on said front cover portion inside said enclosure and a disc pivotably mounted on said front cover portion inside said enclosure, said disc having an eccentric pin and said lever having spaced slot and tongue portions, said operating bar having a driving slot therein, and said eccentric pin being received in said slot portion of said lever and said tongue portion of said lever being received in said driving slot, whereby pivotal movement of said disc effects reciprocal movement of said operating bar, and a locking ring cooperable with said front cover portion and a meter to lock the meter on said front cover portion with said contact blades in said sockets, said manual operator means including flange means pivotably mounted on said front cover portion outside said enclosure and positionable to prevent locking of the meter on said front cover portion by said locking ring while said manual operator means is positioned to dispose said operating bar in a position effecting electrical contact between said line sockets and their respective contact members.

References Cited by the Examiner

UNITED STATES PATENTS 2,088,480  7/1937  Mylius _____ 317—107
3,003,085  10/1961 Rund _____ 317—107

ROBERT K. SCHAEFER, *Primary Examiner.*

KATHLEEN H. CLAFFY, *Examiner.*

M. GINSBURG, *Assistant Examiner.*